(12) United States Patent
Patey et al.

(10) Patent No.: US 9,350,731 B2
(45) Date of Patent: May 24, 2016

(54) SECURE METHOD OF PROCESSING DATA

(71) Applicant: MORPHO, Issy-les-Moulineaux (FR)

(72) Inventors: Alain Patey, Paris (FR); Herve Chabanne, Paris (FR); Julien Bringer, Taverny (FR)

(73) Assignee: MORPHO, Issy-les-Moulineaux (FR)

( * ) Notice: Subject to any disclaimer, the term of this patent is extended or adjusted under 35 U.S.C. 154(b) by 0 days.

(21) Appl. No.: 14/409,027

(22) PCT Filed: Jun. 17, 2013

(86) PCT No.: PCT/EP2013/062503
§ 371 (c)(1),
(2) Date: Dec. 18, 2014

(87) PCT Pub. No.: WO2013/189881
PCT Pub. Date: Dec. 27, 2013

(65) Prior Publication Data
US 2015/0295925 A1    Oct. 15, 2015

(30) Foreign Application Priority Data

Jun. 18, 2012  (FR) ..................... 12 55670

(51) Int. Cl.
*H04L 29/06* (2006.01)
*H04L 9/32* (2006.01)
*G06K 9/00* (2006.01)

(52) U.S. Cl.
CPC .......... *H04L 63/0861* (2013.01); *G06K 9/0061* (2013.01); *H04L 9/3231* (2013.01); *H04L 2209/46* (2013.01)

(58) Field of Classification Search
CPC . H04L 63/0861; H04L 9/3231; G06K 9/0061
USPC ....................................................... 713/186
See application file for complete search history.

(56) References Cited

U.S. PATENT DOCUMENTS 6,182,216 B1 *  1/2001  Luyster ...................... 713/168
8,181,037 B2 *  5/2012  Chen et al. ................. 713/189
(Continued)

OTHER PUBLICATIONS

French Preliminary Search Report with Written Opinion issued May 15, 2013 in Patent Application No. FR 1255670 (with English Translation of Category of Cited Documents).
(Continued)

*Primary Examiner* — Michael S McNally
(74) *Attorney, Agent, or Firm* — Oblon, McClelland, Maier & Neustadt, L.L.P.

(57) ABSTRACT

The invention relates to a secure method of processing data in which method is implemented the evaluation of a function that may be written as a linear combination of sub-functions with two binary inputs, in which a client and a server each possess a binary code, comprising n indexed bits, the method comprising the evaluation of the function with the binary codes of the client and of the server as inputs, without one of the client or the server obtaining information about the code of the other, the method being characterized in that it comprises the following steps: —the server randomly generates n indexed values and calculates the linear combination of these values with the same linear combination as that applied to the sub-functions to obtain the function, —the client implements, for each bit of his binary code, a technique of unconscious transfer to obtain from the server an intermediate data item comprising the randomly generated value of same index as the bit of the code of the client, increased by the value of the corresponding sub-function evaluated at the bit of same index of the code of the server and at said bit of his binary code, and —the client performs a linear combination of the intermediate data for all the bits of his binary code, with the same linear combination as that applied to the sub-functions to obtain the function, in such a way as to obtain a final result comprising the linear combination of the randomly generated values, increased by the evaluation of the function at the two binary codes.

11 Claims, 4 Drawing Sheets

(56) References Cited

U.S. PATENT DOCUMENTS

| | | | |
|---|---|---|---|
| 8,225,100 B2* | 7/2012 | Ciet et al. | 713/180 |
| 8,266,432 B2* | 9/2012 | Asghari-Kamrani et al. | 713/168 |
| 8,281,129 B1* | 10/2012 | Asghari-Kamrani et al. | 713/168 |
| 8,930,692 B2* | 1/2015 | Altmann | 713/168 |
| 8,966,277 B2* | 2/2015 | Rane et al. | 713/186 |
| 2008/0263357 A1* | 10/2008 | Boyen | 713/168 |
| 2010/0100724 A1 | 4/2010 | Kaliski, Jr. | |

OTHER PUBLICATIONS

International Search Report with Written Opinion issued Sep. 25, 2013 in Patent Application No. PCT/EP2013/062503 (with English Translation of Category of Cited Documents).

Bart Goethals, et al., "On Private Scalar Product Computation for Privacy-Preserving Data Mining" Revised Selected Papers of the 7th International Conference on Information Security and Cryptology (ICISC 2004), Lecture Notes in Computer Science, vol. 3506, Dec. 2-3, 2004, pp. 104-120 and Cover Pages.

Shai Avidan, et al., "Blind Vision" TR2006-006, European Conference on Computer Vision (ECCV), Part III, LNCS 3953, May 2006, pp. 1-13 and Cover Pages.

International Search Report issued Sep. 25, 2013 in PCT/EP2013/062503 Filed Jun. 17, 2013.

Marina Blanton, et al., "Secure and efficient protocols for iris and fingerprint identification", International Association for Cryptologic Research, vol. 20110917:024955, XP061004601, Sep. 17, 2011, pp. 1-25.

Claude Castelluccia, et al., "Efficient aggregation of encrypted data in wireless sensor networks", The Second Annual International Conference on Mobile and Ubiquitous Systems: Networking and Services, XP055017676, Jan. 2005, 9 Pages.

\* cited by examiner

SECURE METHOD OF PROCESSING DATA

FIELD OF THE INVENTION

The invention relates to secure processing of data held by a client and a server, of the type in which neither the client nor the server obtains information on the data of the other.

The invention applies to secure methods for biometric identification implementing comparisons by calculating the Hamming distance, and especially to identification methods by iris comparison.

PRIOR ART

The Hamming distance between two binary codes is a well-known mathematical concept, indicating the number of different bits between the two codes. It is mathematically described as $HD(X,Y)=\|(X \oplus Y)\|$, where X and Y are two binary codes and ED is the "exclusive or" operator.

Calculating a Hamming distance is used especially in the field of biometric identification, for example for evaluating the similarity between two irises of individuals to be compared. The works of John Daugman, such as the article *How iris recognition works*; IEEE Transactions on circuits and systems for video technology, vol. 14, N). 1, Jan. 2004, are known, for example.

Two very similar irises have a minimal Hamming distance since the number of bits which differs between the codes representing the iris is low.

It is particularly important in this context to secure operations carried out on the biometric data to preserve the confidentiality of these data, and prevent data used for these operations from being learnt and exploited by third parties. This securing involves making the determination of the Hamming distance safe.

In this respect, secure methods for processing data executing for example the garbled circuits method are known. This is the case of French patent application No. 1162058.

Secure methods for processing data utilising the technique of the homomorphic encryption are also known, such as for example in the publication M. Blanton and P. Gasti, Secure and *Efficient Protocols for Iris and Fingerprint Identification*, ESORICS 2011:190-209.

These methods, although effective from the security viewpoint, have the disadvantage of being costly in calculation time and computer resources to be carried out. Also, they are not optimised for determination of several Hamming distances in parallel, a case which can occur when the aim is to identify an individual by comparing one of his biometric traits to biometric traits of individuals stored in a database.

More generally, there is a need for secure processing of data held by a client and a server, of the type in which neither the client nor the server obtains information on the data of the other, which are fast to use and do not require substantial computing power.

PRESENTATION OF THE INVENTION

The aim of the invention is to eliminate at least one of the disadvantages of the prior art indicated hereinabove.

An aim of the invention is to propose a secure method for evaluation of functions of the type linear combination of sub-functions having two binary inputs, among which is the computing function of a Hamming distance, which is faster to execute and less expensive in computing resources.

Another aim of the invention is to propose a method for determining in parallel several Hamming distances.

In this respect, the invention proposes a secure method for processing data in which evaluation of a function is implemented, the function being described as a linear combination of sub-functions having two binary inputs, in which a client and a server respectively have a binary code comprising n indexed bits, and a binary code comprising n indexed bits, the method comprising evaluation of the function with the binary codes of the client and of the server as inputs, without either the client or the server obtaining information on the code of the other, the method being characterized in that it comprises the following steps:

a) the server randomly generates n indexed values and calculates the linear combination of these values with the same linear combination as that applied to the sub-functions to obtain the function, b) for each bit of its binary code, the client uses a technique of oblivious transfer to obtain from the server an intermediate datum comprising the randomly generated value of the same index as the bit of the code of the client, added to the value of the sub-function corresponding evaluated in the bit of the same index of the code of the server and in said bit of its binary code, and c) the client makes a linear combination of the intermediate data for all the bits of its binary code, with the same linear combination as that applied to the sub-functions to obtain the function, so as to obtain a final result comprising the linear combination of the randomly generated values added to the evaluation of the function in the two binary codes.

Advantageously, though optionally, the method according to the invention can also comprise at least one of the following characteristics:

in between step a) and step b) the server generates an indexed set of doublets associated with the code, each doublet corresponding to a bit of the same index of the binary code, and comprising in this order:

the sum of the randomly generated value of the same index as the bit and the function evaluated in said bit and zero, and the sum of the randomly generated value of the same index as the bit and the function evaluated in said bit and one, and in which the client retrieves by oblivious transfer, for each bit of its binary code, the element of the doublet of the same index as the bit of the code of the client such that:

if the bit of the code of the client is equal to 0, the client retrieves the first element of the doublet, and if the bit of the code of the client is equal to 1, the client retrieves the second element of the doublet.

The method also comprises the following steps:

the client sends to the server the final result, and the server subtracts from the final result the linear combination of randomly generated values to obtain evaluation of the function in the binary codes.

The method also comprises the following steps:

the server sends to the client the linear combination of the randomly generated values, and the client subtracts from the final result the linear combination of the randomly generated values to obtain evaluation of the function in the binary codes.

the server has at least two binary codes of n indexed bits, and during step a), the server generates as many sets of random values as it has binary codes and calculates the linear combinations of the values of each set, the server generates as many indexed sets of doublets as it has binary codes, and concatenates said sets of doublets, and the intermediate datum obtained by the client comprises concatenation, for all the binary codes of the server, of the intermediate data which the client would have obtained individually for each binary code of the server.

after at least one operation undertaken, each client and server publishes information from which the other can detect:

whether the operation performed complies with protocol, and whether the operation has been performed on corrupt data.

the function to be evaluated is the Hamming distance between the binary codes of client and server, with determination of the Hamming distance comprising determination of the number of bits of the same index whereof the value differs from one code to the other, and in which:

during step a) the linear combination of randomly generated values is the sum of said values, during step b) the intermediate datum retrieved by the client for each bit of its binary code is the sum of the randomly generated value of the same index as the bit of the code of the client, and of the result of the operation "exclusive or" between the bit of the code of the client and the bit of the same index of the code of the server, and during step c) the client sums the intermediate data for all bits of its binary code to obtain the sum of randomly generated data added to the Hamming distance between the two binary codes.

each binary code of the client and of the server is also associated with a binary mask code of size n, whereof the index of the bits at 1 indicate the index of the bits of codes of the client and of the server to be taken into account for determination of the Hamming distance, and during step a) the server randomly generates two sets of values and their respective sums, during step b) the intermediate datum retrieved by the client for each bit of its binary code comprises two elements, whereof:

The first comprises a randomly generated value from the first set, added to the value of the intersection between the result of the operation "or exclusive" between the bit of the code of the client and the bit of the same index of the code of the server, and the values of the corresponding bits of the mask codes, the second element of the intermediate datum for each bit of the binary code of the client comprises a randomly generated value from the second set added to the intersection of the values of the corresponding bits of the mask codes, and during step c) the client totals:

on the one hand, the first elements of the intermediate data to obtain the value of the Hamming distance between the codes of the client and of the server on the bits at 1 of the mask codes added to the first sum of the randomly generated values, and on the other hand, the second elements of the intermediate data to obtain the size of the intersection of the mask codes added to the second sum of randomly generated values.

the binary codes are biometric data.

the binary codes are encoded iris images.

The invention also proposes a system for identification of an individual, comprising at least one control server of an individual to be identified, and at least one administration server of a base of N reference data of listed individuals, the control server being adapted to proceed with acquisition of a datum of the individual, the system being characterized in that the control server and the administration server comprise processing means adapted to execute the secure method for evaluation of a function according to any one of the preceding claims between the datum of the individual and at least one reference datum of listed individuals to determine the Hamming distances between the datum of the individual and each reference datum, and to determine the reference datum having similarities with the datum of the individual to be identified exceeding a predetermined threshold, for identifying the individual as the listed individual from which said reference datum originates.

Performing the technique of oblivious transfer for evaluating a function secures operations carried out on data, since the client retrieves no information on the code held by the server, and also limits the quantity of information retrieved by the client for making the method less costly in computing time.

DESCRIPTION OF FIGURES

Other characteristics, aims and advantages of the present invention will emerge from the following detailed description with respect to the appended figures given by way of non-limiting examples in which.

DETAILED DESCRIPTION OF AT LEAST ONE EMBODIMENT OF THE INVENTION

Figure 1A:
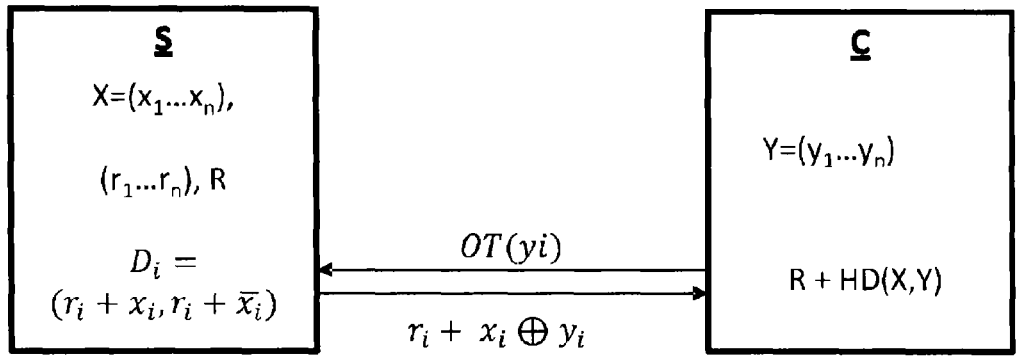
FIGS. 1$a$, 1$b$ and 1$c$ illustrate embodiments of the method for comparison of data proposed by the invention.

In reference to FIG. 1$a$, this shows a server S and a client C respectively having a binary code X and Y. One or the other of the server S or client C wants to know the value of the Hamming distance between the two binary codes, but without releasing to the other information on the binary code which it holds.

Each binary code X and Y comprises n bits, indexed respectively $x_1, \ldots, x_n$ and $y_1, \ldots, y_n$.

Secure Determination of a Hamming Distance

Figure 2:
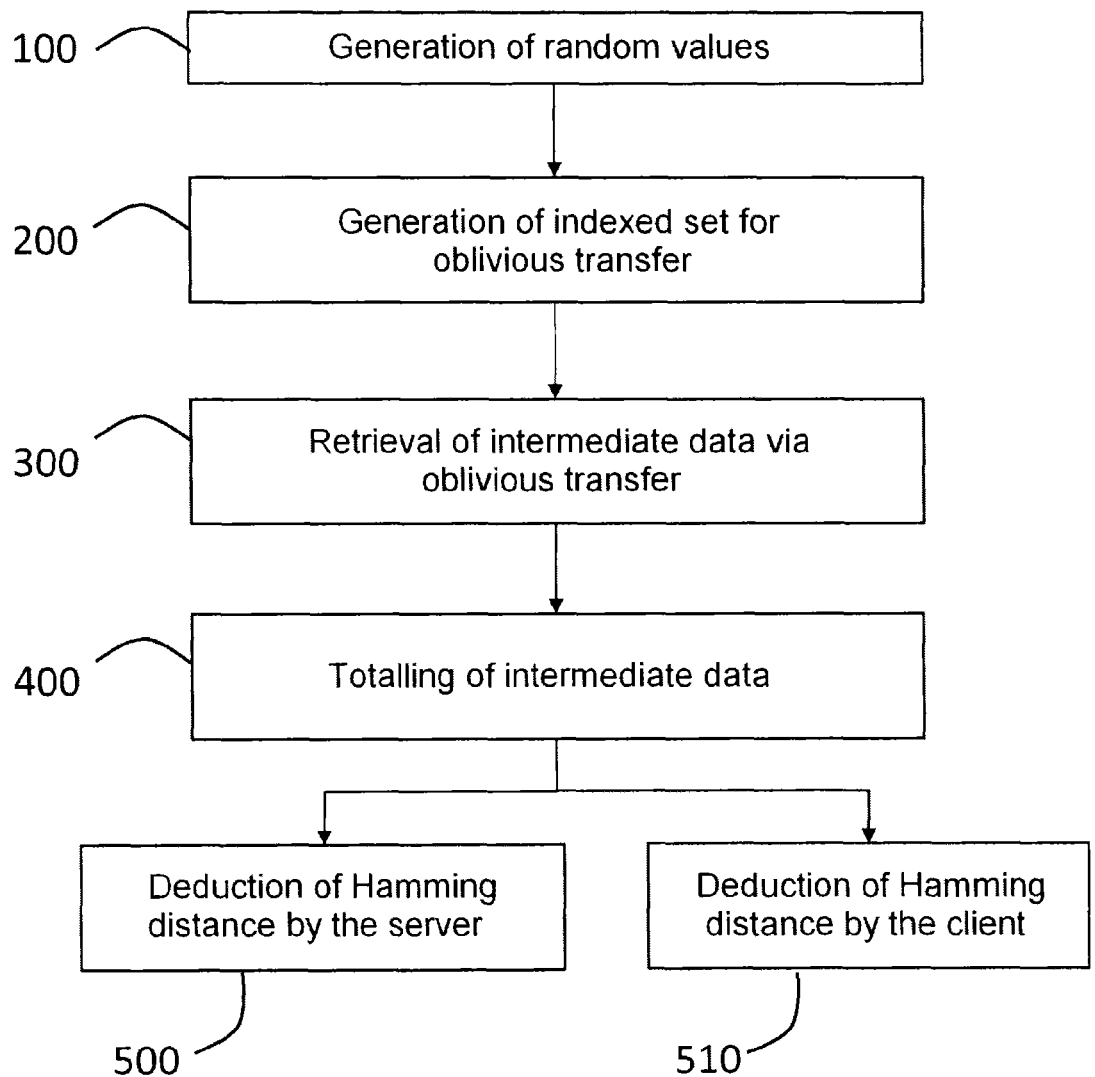
FIG. 2 illustrates the main steps of the method proposed by the invention.

In reference to FIG. 2, the main steps of the method according to the invention are shown. During a step 100, the server generates n random values $r_1, \ldots, r_n$. These values are preferably integers, and more advantageously elements of $\mathbb{Z}_{n+1}$. The server calculates the sum R of these values, $R=\Sigma_{i=1}^{n} r_i$.

During a step 200, the server S generates an indexed set of elements which can be transferred to the client by oblivious transfer. In this case, this is a set of doublets $D_i$, each doublet being associated with the bit of the same index $x_i$ of the code.

The first element of a doublet $D_i$ is the sum of the randomly generated value of the same index $r_i$ and of the bit $x_i$, whereas the second element is the sum of the randomly generated value of the same index $r_i$ and of the conjugate of the bit $x_i$.

Each doublet is therefore described as $D_i=(r_i+x_i, r_i+\overline{x_i})$, for i between 1 and n.

During a step 300, the client engages with the server oblivious transfer for each bit of its binary code.

Oblivious transfer is a computing operation between two parties P1 and P2. In this type of operation, P1 has a list of N indexed elements $X_i$, and P2 knows the number N of elements of the list and selects an index i between 0 and N−1. By oblivious transfer, P2 retrieves the $i^{th}$ element of P1, that is, the element of P1 indexed by i.

P1 learns no information on the index of the element retrieved by P2.

P2 retrieves no information on the other elements of the list held by P1.

The method of oblivious transfer is applied here to determination of the Hamming distance. In this context the client makes, for each bit $y_i$ of its binary code, an oblivious transfer of one of the elements of a doublet $D_i$ of the same index.

The element of the doublet transferred is a function of the value of the bit $y_i$: if $y_i=0$, the client C receives by oblivious transfer the first element of the doublet, that is, $r_i+x_i$. If $y_i=1$, the client receives the second element of the doublet, that is, $r_i+\overline{x_i}$.

As retrieval of the element is done by oblivious transfer, the server S is unaware of which element has been communicated and so it cannot deduce the value of $y_i$ from it.

Also, as each element comprises a random value, the client C cannot deduce from it the value of the bit $x_i$ or $\overline{x_i}$ which he has retrieved.

In this way, the value of the bit of the binary code contained in the element retrieved by the client is bound up with the result of the exclusive or operation between $x_i$ and $y_i$. In fact, it can easily be verified that the client obtains a datum $d_i$ equal to $$d_i = r_i + x_i \oplus y_i$$

For each bit of its binary code the client therefore receives an intermediate datum $d_i$ comprising the randomly generated value $r_i$ of the same index as the bit $y_i$ of its binary code, added to the value of the operation "exclusive or" between the bit of the code $y_i$ of the client and the bit of the same index $x_i$ of the code of the server.

The client then totals, during a step 400, the set of intermediate data di corresponding to the bits of its binary code, and obtains a final result $RF=\Sigma_{i=1}^{n}(r_i+x_i\oplus y_i)=R+HD(X,Y)$. The final result RF comprises the sum R of the randomly generated values $r_i$, added to the Hamming distance between the two binary codes X and Y.

The remainder of the method depends on the recipient of the result of the data comparison method. If it is the server which must know the Hamming distance, during a step 500, the client sends the final result RF to the server which subtracts therefrom the sum R of the randomly generated values to obtain the Hamming distance HD(X,Y).

If it is the client which must know the Hamming distance, during a step 510, the server sends to the client the sum R of the randomly generated values. The client can subtract from the final result RF this sum R to obtain the value of the Hamming distance.

This data treatment method can be generalised on evaluation of functions other than the "Hamming distance" function, especially of those functions described as the linear combination of sub-functions of two binary inputs $f(X,Y)=\Sigma_i f_i(x_i,y_i)$.

In this case, during step 100, the server S also generates n random integers $r_1, \ldots, r_n$, and calculates the linear combination $R=\Sigma_{i=1}^{n}\lambda_i r_i$, where the same linear combination (that is, with the same coefficients $\lambda_i$) is applied for calculating R as what is applied to the sub-functions $f_i$ to obtain the function F.

During step 200, the doublets $D_i$ generated by the server S are in the form $D_i=(r_i+f_i(x_i,0), r_i+f_i(x_i,1))$.

The output obtained by the client during step 300 of oblivious transfer for each function is therefore $f_i$, $t_i=r_i+f_i(x_i,y_i)$.

So, during step 400, the client C totals the set of $\lambda_i t_i$ to obtain $T=\Sigma_{i+1}^{n}\lambda_i t_i$. Steps 500 and 510 are the same as before: during step 500, the client sends the total T to the server which can calculate T−R and return the value T−R to the client. During step 510, the server sends R to the client which calculates and returns the value T−R to the server.

This computing method encompasses the function of Hamming distance type by taking for all the $f_i$, $f_i(x_i,y_i)=x_i\oplus y_i$ and all the $\lambda_i$ equal to 1.

Determination of Several Hamming Distances in Parallel

The same principle for secure determination of Hamming distance can be executed to determine several Hamming distances at the same time.

Figure 1B:
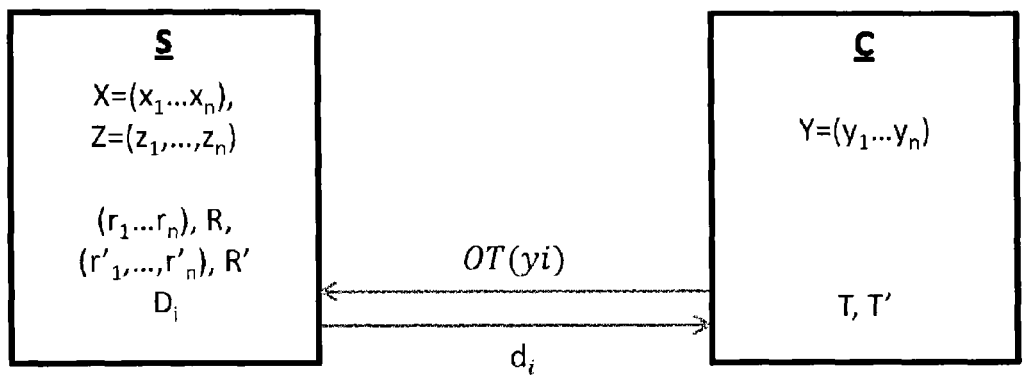

In reference to FIG. 1b, the server S has several binary codes $X^1=x^1_1, \ldots, x^1_n, \ldots, X^N=x^N_1, \ldots, x^N_n$ to be compared to the binary code of the client Y.

During step 100 illustrated in FIG. 2, the server S generates n random values for each binary code. For example, in the case of two binary codes $X^1$, $X^2$, the server randomly generates n values $r_1, \ldots, r_n$ associated with the first binary code $X^1$, and n values $r'_1, \ldots, r'_n$ associated with the second binary code $X^2$. Also, the server calculates the sums R and R' of each set of values $(r_1, \ldots, r_n)$ and $(r'_1, \ldots, r'_n)$.

Similarly to earlier, during step 200 the server then creates a set of doublets $D_i$ which can be transferred to the client by oblivious transfer, each doublet $D_i$ being associated with the bits $x^1_i$, $x^2_i$ of the same index of the binary codes $X^1$ and $X^2$.

To do this, the server generates as many indexed sets of doublets as it has binary codes $X^j$, each doublet being associated with a bit of a binary code, and as earlier constructs from the bit of the binary code and a randomly generated value of the same index. The server concatenates said sets to obtain a doublet $D_i$ therefore described as:

$$D_i = (r_i + x_{1i} \| r'_i + x_{2i}, r_i + \overline{x1}_i \| r'_i + \overline{x_2}_i)$$

The client then runs the oblivious transfers of step 300 and retrieves, for each bit $y_i$ of its binary code, an intermediate datum $d_i$ constituted by the concatenation of intermediate data which the client would have received separately for each binary code of the server:

$$d_i = (r_i + x_{1i} \oplus y_i \| r'_i + x_{2i} \oplus y_i)$$

In the same way as before, during step 400 the client can total the set of retrieved intermediate data, for all the bits yi of its binary code, and for each binary code of the server obtain the Hamming distance between this binary code and that of the client, added to a sum of randomly generated values known by the server.

The client can then send these sums to the server for all or some of the binary codes of the server during step 500 so that the latter deducts therefrom the Hamming distance between the binary code of the client and its own, from the sums R, R', of randomly generated values.

Conversely, during step 510, the server can send the client all or some of the sums R, R' of randomly generated values, and the client deduces from these the Hamming distances between the corresponding binary codes of the server and its binary code.

Determination of a Weighted Hamming Distance

A variant method is determination of weighted Hamming distances, applicable especially in a context of biometric identification by iris comparison of individuals.

Figure 3:
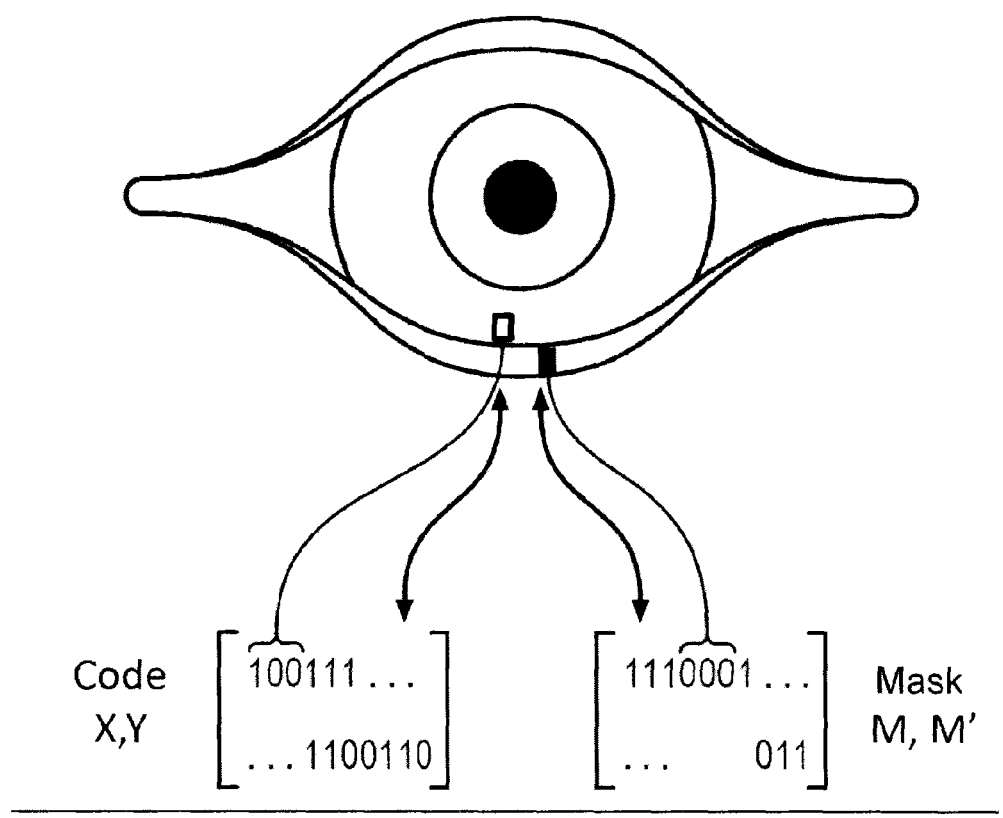
FIG. 3 schematically illustrates coding of an iris for application of the method to biometric identification by iris comparison, FIGS. 4$a$ and 4$b$ illustrate a context for executing the method.

In reference to FIG. 3, when biometric identification is used by iris comparison, the visible zones of the iris are compared by determining the Hamming distance between binary codes representing these zones.

Yet, so as to compare only the visible zones of the iris, a mask, in the form of a binary code whereof the bits at 1 correspond to visible zones of the eye, is associated with each iris code.

The weighted Hamming distance is therefore the Hamming distance considered solely for visible zones common to both irises compared. It is:

$$HD(X,Y) = \frac{\|(X \oplus Y) \cap M \cap M'\|}{\|M \cap M'\|},$$

where M is a mask code associated with the code X, and M' is a mask code associated with the code Y.

A method for determination of a weighted Hamming distance will now be described.

Figure 1C:
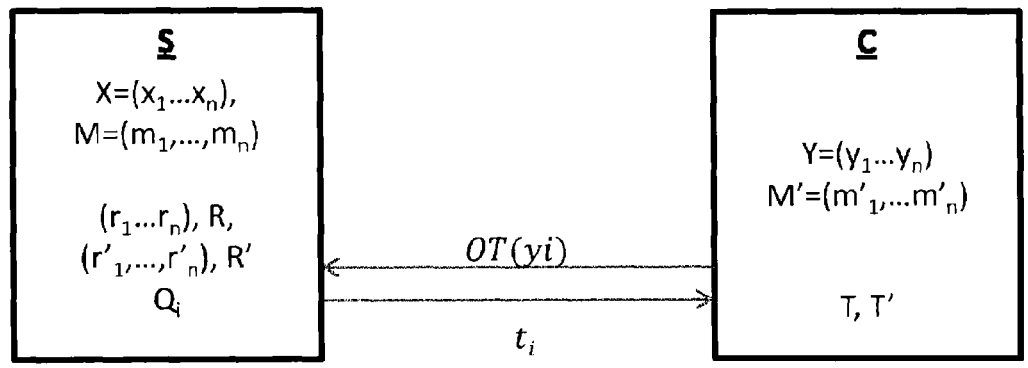

In reference to FIG. 1c, each binary code of the client and of the server is associated with a respective mask code $M=(m_1, \ldots, m_n)$, $M'=(m'_1, \ldots m'_n)$.

During step 100, the server S randomly generates two sets of n data $r_1, \ldots, r_n, r'_1, \ldots, r'_n$, as well as their respective sums R and R'.

During step 200, the server S generates an indexed set whereof each element corresponding to a bit of the binary code and a bit of the mask code of the same index. Each element is:

$$Q_i = \{(r_i, r'_i), (r_i, r'_i), (r_i + m_i \cdot x_i, r'_i + m_i), (r_i + m_i \cdot \overline{x_i}, r'_i + m_i)\}.$$

During step 300, the client uses oblivious transfer, by retrieving one of the elements of $Q_i$ for each bit $y_i$, as a function of the value of the bit $y_i$ and of the value of the bit of the corresponding mask code of Y.

If $y_i=0$, $m'_i=0$, the client retrieves $(r_i, r'_i)$.
If $y_i=1$, $m'_i=0$, the client retrieves $(r_i, r'_i)$.
If $y_i=0$, $m'_i=1$, the client retrieves $(r_i + m_i \cdot x_i, r'_i + m_i)$.
If $y_i=1$, $m'_i=1$, the client retrieves $(r_i + m_i \cdot \overline{x_i}, r'_i + m_i)$.

In this way, the client in fact retrieves an intermediate datum composed of two variables $t_i$, $t'_i$ such as:

$$t_i = r_i + m_i \cdot m'_i \cdot (x_i \oplus y_i)$$

$$t'_i = r'_i + m_i \cdot m'_i$$

During step 400, the client totals the intermediate data for all the bits $y_i$ of its code Y.

$$T = \sum_{i=1}^{n} t_i = R + \|(X \oplus Y) \cap M \cap M'\|$$

$$T' = \sum_{i=1}^{n} t'_i = R' + \|M \cap M'\|$$

The final result obtained by the client comprises a value T equal to the numerator of the Hamming distance, added to the sum of the first randomly generated values $r_1, \ldots, r_n$. The numerator of the Hamming distance is in fact the Hamming distance between the two iris codes, solely for the portions corresponding to non-masked zones, that is, zones for which the bits of the mask codes are at 1.

The final result also comprises a value T' equal to the denominator of the Hamming distance, added to the sum of second randomly generated values $r'_1, \ldots, r'_n$. The denominator of the Hamming distance corresponds to the size of the code considered for determination of the weighted Hamming distance.

As previously, the remainder of the method depends on the person who must produce the Hamming distance. If it is the server wanting to know the Hamming distance, during step 500 the client sends it the two values T and T', from which the server subtracts respectively R and R' to obtain the numerator and the denominator of the Hamming distance. What then remains is to divide one by the other.

If the client must know the Hamming distance, during step 510 the server sends to the client the sums R and R' of the first and second randomly generated values. The client subtracts these sums respectively from the values T and T' to obtain the numerator and the denominator of the Hamming distance. The division produces this distance.

This processing variant is also compatible with determination at the same time of several Hamming distances as explained hereinabove.

Securing the Method in Case of Malicious Interlocutors

Variants of the comparison method explained hereinabove allow securing of calculation in the case of "semi-honest" interlocutors, that is, interlocutors which follow the steps of the method while trying to obtain additional information on the data held by the other interlocutors.

Another case of implementation is in the event of "malicious" interlocutors which use any type of strategy to obtain information on the data held by the others, if needed without rigorously following the steps of the method.

To secure the method in case of malicious interlocutors, it can be ensured that at each operation performed by the client or by the server, the latter publishes, for the other, information from which the other can detect if the operation belongs or not to the protocol which must be executed and if it has been used on corrupt data.

To do this homomorphic encryption tools can be used as known to the man skilled in the art, allowing two parties to make calculation on encrypted data without needing to decrypt or know the secret deciphering key. For more information reference could be made to the publication Mehmet S. Kiraz, Berry Schoenmakers, Jose Villegas: Efficient Committed Oblivious Transfer of Bit Strings. ISC 2007:130-144.

For example, an operation Com called "commitment" or "pledging" which benefits from the property of homomorphism can be employed, that is, it uses operations ⊞ and ⊙ such as:

$Com(x_1, r_1) \odot Com(x_2, r_2) = Com(x_1 \boxplus x_2, r_1 \boxplus r_2)$, no matter what $x_1, x_2, r_1, r_2$. ⊞ is for example addition and ⊙ multiplication.

These pledging operations are applied to the set of steps of the method.

First, prior to step 100 for generation of random values by the server, the client C calculates and publishes $Com(y_i, \chi_i)$ for each bit $y_i$ of its binary code. By using proof with zero disclosure also proves knowledge that the bits $y_i$ of C are definitely bits.

Then, when the server generates doublets $D_i = (r_i + x_i, r_i + \overline{x_i})$ at step 200, it can generate proof with zero disclosure of knowledge that the difference between both elements of the doublet is an absolute value 1, without disclosing the doublet. In the opposite case, the client detects that there has been fraud on the part of the server.

The server S then pledges the elements of each doublet, noting $D_i=(a_i,b_i)$, the server calculates and publishes $(A_i=Com(a_i,\alpha_i))_{i=1\ldots n}$ and $(B_i=Com(b_i,\beta_i))_{i=1\ldots n}$ During oblivious transfer step 300 the client receives from the server, apart from the intermediate data $t_i$, corresponding data $\tau_i$, and it pledges the intermediate data, that is, it calculates and publishes, for any i, a datum $C_i=Com_i(t_i,\tau_i)$ a function of $t_i$ and $\tau_i$, this datum not letting the server deduce the values of $t_i$ and $\tau_i$.

When the client has totaled the intermediate data $t_i$ to obtain the result T, it also totals the data $\tau_i$ to obtain a total T'.

The client then calculates $Com(T,T')=Com(\Sigma_{i=1}^{n}t_i, \Sigma_{i=1}^{n}\tau_i)=Com(t_1 \boxplus \ldots \boxplus t_n, \tau_1 \boxplus \ldots \boxplus \tau_n)=C_1 \odot \ldots \odot C_n$ as mentioned previously, and publishes $Com(T,T')$.

It then sends the server the sums T and T'. The server, having previously had access to all the $C_i$, is capable of calculating $C_1 \odot \ldots \odot C_n$ and therefore verifying the value of $Com(T,T')$, for verifying that the data $t_i$ and therefore the data $y_i$, have not been corrupted.

Alternatively, the server S calculates:

$$K=Com(2R+n,\rho)=A_1 \odot \ldots \odot A_n \odot B_1 \odot \ldots \odot B_n$$

The server S sends R and proof that $K=Com(2R+n,\rho)$ to the client, and the client C calculates $K=A_1 \odot \ldots \odot A_n \odot B_1 \odot \ldots \odot B_n$ and verifies the proof that $K=Com(2R+n,\rho)$. Finally, the client calculates and returns to the server the total T−R.

The same type of secure measuring is applicable to other operations performed in the calculation.

Figure 4A:
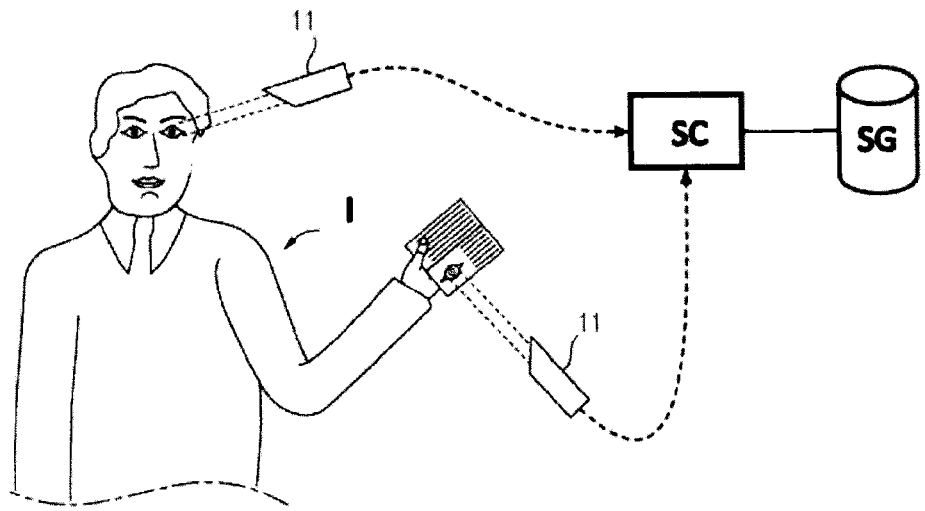
Figure 4B:
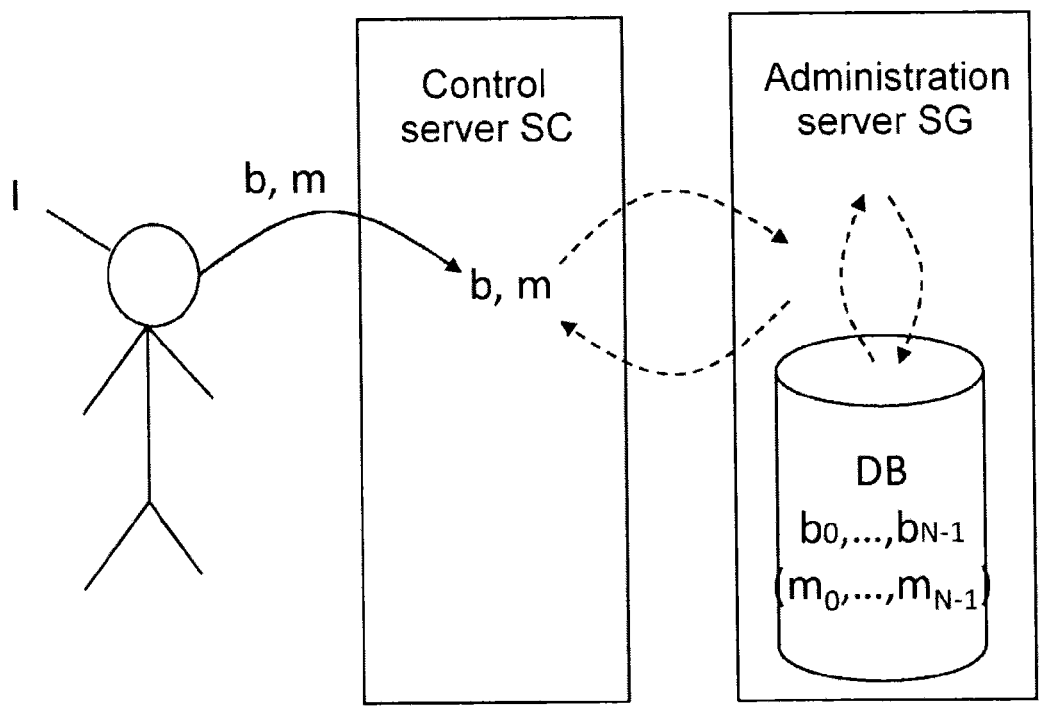

In reference to FIGS. 4a and 4b, these show a context for executing the method for biometric identification of an individual. This identification can for example be access control to a secure place.

A database DB comprises a set of N indexed biometric data $b_i$, i being between 0 and N−1, of listed individuals as being for example authorised to enter a place, or else whose presence is prohibited in this place.

This database DB is linked to an administration server SG which can be fitted with computing means used by an appropriated program. The administration server constitutes the server S of the method described hereinabove.

The individual I is identified by a control server SC, also fitted with computing means used by an appropriated program, and also comprises means 11 for acquisition and processing of a datum particular to the individual, especially a biometric datum b.

The datum b can originate as known from an image digitised and encoded with biometric character such as especially the iris of the individual.

The datum b can also be stored in digital form in an identity document of the individual.

The data $b_0$ to $b_{N-1}$ of the base are in this case also encoded iris images of individuals. In this case, the database DB also comprises, for each iris datum $b_i$, a corresponding mask code $m_i$. The control server can also acquire a mask code m corresponding to the iris image b, or method the datum b to obtain it. These mask codes indicate the zones of the visible irises, and therefore exploitable, these zones being typically those not masked by the eyelids or eyelashes.

Once the control server has obtained the biometric datum b of the individual encoded in the form of binary iris code, as well as the corresponding mask code, it can engage the comparison method between the datum b and the set of iris data $b_i$ stored in the database as described previously in reference to FIGS. 1 to 3. The control server constitutes the client which dialogues with the server.

Preferably, but non-limiting, the control server engages a comparison method at the same time between the datum b and several data $b_i$, each of these comparisons comprising determination of a weighted Hamming distance by the corresponding mask codes.

Also, it is preferably the administration server which obtains the values of the Hamming distances.

Once the datum b has been compared to all the data $b_i$, the administration server identifies, when appropriate, the datum $b_i$ among all the data $b_i$ having the most similarities with the datum b, or that whereof the Hamming distance with the datum b is less than a predetermined threshold, which corresponds to a rate of similarity between the two data exceeding a predetermined threshold.

If this datum $b_i$ exists, this means that the individual from which this datum originates corresponds to the individual to be identified.

As a function of the result obtained by the administration server, the latter initiates or not a subsequent step, for example it can authorise or refuse access of the individual to a secure place for which identification has occurred.

The method described has the advantage of being secure and easy to carry out. It can be declined into many variants, especially for any type of function to be evaluated from data held by different interlocutors which must maintain confidentiality relative to each other, and also, in the case of comparison calculation from Hamming distances, according to the number of Hamming distances to be determined and the application context, or even the nature of interlocutors carrying out the method.

Below is an example of implementation of the method for calculating a Hamming distance.

Here is an example of implementation of the method for calculating a Hamming distance.

Inputs:
Server S: a chain of n bits $X=(x_1, \ldots, x_n)$
Client Cl: a chain of n bits $Y=(y_1, \ldots, y_n)$
Output:
First Option: S obtains $d_H(X,Y)$ and Cl obtains nothing
Second Option: Cl obtains $d_H(X,Y)$ and S obtains nothing
Protocol:

1. S generates n random values $r_1, \ldots, r_n \in_R \mathbb{Z}_{n+1}$ and calculates $R=\Sigma_{i=1}^{n}r_i$
2. For each $i=1, \ldots, n$, S and Cl execute an $OT_1^2$ where S is the sender and Cl the receiver.
   the selection bit of Cl is $y_i$.
   the input of S is $(r_i+x_i, r_i+\bar{x}_i)$.
   The output obtained by Cl is therefore $t_i=r_i+(x_i \oplus y_i)$.
3. Cl calculates $T=\Sigma_{i=1}^{n}t_i$
4. First Option:
   (a) Cl sends T to S
   (b) S calculates and returns T−R
   Second Option:
   (a) S sends R to Cl
   (b) Cl calculates and returns T−R Example of Hamming Distance—Case of Malicious Adversaries:
Inputs:
Server S: a chain of n bits $X=(x_1, \ldots, x_n)$
Client Cl: a chain of n bits $Y=(y_1, \ldots, y_n)$
Output:
First Option: S obtains $d_H(X,Y)$ and Cl obtains nothing
Second Option: Cl obtains $d_H(X,Y)$ and S obtains nothing Protocol:
1. Cl pledges its bits $y_i$: it calculates and publishes $Com(y_i, x_i)$ for each $i=1 \ldots n$. It also proves, using proof of knowledge, with zero disclosure of knowledge, on pledges, that $y_i=0$ or $y_i=1$.
2. S generates n random values $r_1, \ldots, r_n \in_R \mathbb{Z}_{n+1}$ and calculates $R=\Sigma_{i=1}^n r_i$
3. For each $i=1,\ldots,n$, S calculates $(a_i,b_i)=(r_i+x_i, r_i+\bar{x}_i)$ and pledges $a_i$ and $b_i$. It and calculates and publishes $(A_i=Com(a_i,\alpha_i))_{i=1,\ldots,n}$ and $(B_i=Com(b_i,\beta_i))_{i=1,\ldots,n}$
4. S proves to Cl, using proof with zero disclosure of knowledge on pledges, that $|b_i-\alpha_i|=1$, for each $i=1,\ldots,n$.
5. For each $i=1,\ldots,n$, S and Cl execute a COT where S is the sender and Cl the receiver.
    the selection bit of Cl is $y_i$.
    the input of S is $(a_i, b_i)$.
    The output obtained by Cl is $t_i=r_i+(x_i \oplus y_i)$ et $\tau_i$.
    The two parts obtain $C_i=Com(t_i, \tau_i)$
6. Cl calculates $T=\Sigma_{i=1}^n t_i$
7. First Option:
    (a) Cl calculates $C=Com(T,\tau)=C_1 \odot \ldots \odot C_n$
    (b) Cl sends T and proof to S that $C=Com(T,\tau)$
    (c) S calculates $C=C_1 \odot \ldots \odot C_n$ and verifies proof that $C=Com(T,\tau)$.
    (d) S calculates and returns T−R
    Second Option:
    (a) S calculates $K=Com(2R+n,\rho)=A_1 \odot \ldots \odot A_n \odot B_1 \odot \ldots B_n$
    (b) S sends R and proof that $K=Com(2R+n,\rho)$ to Cl
    (c) Cl calculates $K=A_1 \odot \ldots \odot A_n \odot B_1 \odot \ldots B_n$ and verifies proof that $K=Com(2R+n,\rho)$.
    (d) S sends R to Cl
    (e) Cl calculates and returns T−R Secure Evaluation of a Linear Combination Function of Functions Having 2 Binary Inputs:
Inputs:
    Server S: a chain of n bits $X=(x_1, \ldots, x_n)$
    Client Cl: a chain of n bits $Y=(y_1, \ldots, y_n)$
Output:
    First Option: S obtains $f(X,Y)=\Sigma \lambda_i f_i(x_i,y_i)$ and Cl obtains nothing
    Second Option: Cl obtains $f(X,Y)=\Sigma \lambda_i f_i(x_i,y_i)$ and S obtains nothing
Protocol:
1. S generates n random values $\tau_1, \ldots, \tau_n \in_R \mathbb{Z}_{n+1}$ and calculates $R=\Sigma_{i=1}^n \lambda_i t_i$
2. For each $i=1,\ldots,n$, S and Cl execute an $OT_1^2$ where S is the sender and Cl the receiver.
    the selection bit of Cl is $y_i$.
    The input of S is $(r_i+f_i(x_i,0), r_i+f_i(x_i,1))$.
    The output obtained by Cl is therefore $t_i=r_i+f_i(x_i,y_i)$.
3. Cl calculates $T=\Sigma_{i=1}^n \lambda_i t_i$
4. First Option:
    (a) Cl sends T to S
    (b) S calculates and returns T−R
    Second Option:
    (a) S sends R to Cl
    (b) Cl calculates and returns T−R

The invention claimed is:

1. A secure method of identification or authentication of an individual (I) among a base (DB) of N reference data ($b_0 \ldots b_{N-1}$) of listed individuals by evaluation of a function (F) described as a linear combination of sub-functions ($f_i$) with two binary inputs, wherein a client (C) and a server (S) respectively have a binary code (X), comprising n indexed bits ($x_1, \ldots x_n$), and a binary code (Y), comprising n indexed bits ($y_1, \ldots, y_n$), the method comprising evaluation of the function (F) with the binary codes (X) and (Y) of the client (C) and of the server (S) as inputs, without either the client (C) or the server (S) obtaining information on the code of the other,
    the method comprising:
        acquiring a datum (b) of the individual (I):
        evaluating the function (F) between the datum (b) of the individual (I) and at least one reference datum of the listed individuals to determine a Hamming distance between the datum (b) and the at least one reference datum by performing a method including
            the server randomly generates n indexed values ($r_i$) and calculates the linear combination (R) of these values with the same linear combination as that applied to the sub-functions ($f_i$) to obtain the function (F),
            for each bit ($y_i$) of its binary code (Y), the client employs a technique of oblivious transfer to obtain from the server an intermediate datum comprising the randomly generated value ($r_i$) of the same index as the bit ($y_i$) of the code of the client, added to the value of the corresponding sub-function evaluated in the bit of the same index of the code of the server and in said bit of its binary code ($f_i(x_i,y_i)$), and
            the client performs a linear combination of the intermediate data for all the bits ($y_i$) of its binary code, with the same linear combination as that applied to the sub-functions to obtain the function (F), so as to obtain a final result (RF) comprising the linear combination (R) of randomly generated values ($r_1, \ldots, r_n$) added to evaluation of the function in both binary codes;
        comparing the Hamming distance between the datum (b) and the at least one reference datum to a predetermined threshold; and
        according to the results of the comparison, determining whether the individual (I) is a listed individual from which the at least one reference datum originates.

2. The secure method according to claim 1, wherein, after the server randomly generates n indexed values ($r_i$) and calculates the linear combination (R) of these values, the server generates an indexed set of doublets ($D_i$) associated with the code, each doublet corresponding to a bit ($x_i$) of the same index of the binary code, and comprising in this order:
    the sum ($r_i+f(x_i,0)$) of the randomly generated value ($r_i$) of the same index as the bit and the function evaluated in said bit ($x_i$) and zero, and
    the sum ($r_i+f(x_i,1)$) of the randomly generated value ($r_i$) of the same index as the bit and the function evaluated in said bit ($x_i$) and one,
    and wherein the client retrieves by oblivious transfer, for each bit ($y_i$) of its binary code, the element of the doublet ($D_i$) of the same index as the bit ($y_i$) of the code of the client such that:
    if the bit ($y_i$) of the code of the client is equal to 0, the client retrieves the first element of the doublet ($D_i$), and
    if the bit ($y_i$) of the code of the client is equal to 1, the client retrieves the second element of the doublet ($D_0$).

3. The secure method according to claim 2, wherein the server has at least two binary codes ($X^1, \ldots, X^N$) of n indexed bits, and
    during randomly generating n indexed values ($r_i$) and calculating the linear combination (R) of these values, the server generates as many sets of random values ($r^1_i, \ldots,$ $r''_i$) as it has binary codes and calculates the linear combinations ($R^1, \ldots, R^N$) of the values of each set, the server generates as many indexed sets of doublets ($D_i$) as it has binary codes ($X^1, \ldots, X^N$), and concatenates said sets of doublets, and the intermediate datum obtained by the client comprises concatenation, for all the binary codes ($X^1, \ldots, X^N$) of the server, of the intermediate data which the client would have obtained separately for each binary code of the server.

4. The secure method according to claim 1, further comprising the following steps:

the client sends to the server the final result (RF), and the server subtracts from the final result the linear combination (R) of randomly generated values to obtain evaluation of the function in the binary codes.

5. The secure method according to claim 1, further comprising the following steps:

the server sends to the client the linear combination (R) of the randomly generated values, and the client subtracts from the final result (RF) the linear combination of the randomly generated values to obtain evaluation of the function in the binary codes.

6. The secure method according to claim 1, wherein each of the client and of the server publishes, after at least one operation carried out, information from which the other can detect:

if the operation used complies with protocol, and if the operation has been used on corrupt data.

7. The secure method according to claim 1, wherein the function to be evaluated is the Hamming distance between the binary codes of client and server, with determination of the Hamming distance comprising determination of the number of bits of the same index whereof the value differs from one code to the other, and wherein:

during randomly generating n indexed values ($r_i$) and calculating the linear combination (R) of these values, the linear combination of randomly generated values is the sum of said values, when the client employs a technique of oblivious transfer to obtain from the server an intermediate datum, the intermediate datum retrieved by the client for each bit ($y_i$) of its binary code is the sum of the randomly generated value ($r_i$) from the same index as the bit ($y_i$) of the code of the client, and from the result of the operation "or exclusive" between the bit of the code ($y_i$) of the client and the bit of the same index ($x_i$) of the code of the server, and when the client performs a linear combination of the intermediate data for all the bits ($y_i$) of its binary code, the client totals the intermediate data for all bits of its binary code to obtain the sum of the data randomly generated added to the Hamming distance between the two binary codes (X,Y).

8. The secure method according to claim 1, wherein each binary code of the client and of the server is also associated with a binary mask code (M, M') of size n, whereof the index of the bits ($m_i$) at 1 indicate the index of the bits ($x_i$, $y_i$) of codes of the client and of the server to be considered for determination of the Hamming distance, and during randomly generating n indexed values (r) and calculating the linear combination (R) of these values, the server randomly generates two sets of values ($r_i$, $r'_i$) and their respective sums (R, R'), when the client employs a technique of oblivious transfer to obtain from the server an intermediate datum, the intermediate datum retrieved by the client for each bit ($y_i$) of its binary code comprises two elements, whereof:

the first comprises a value ($r_i$) randomly generated from the first set, added to the value of the intersection between the result of the operation "or exclusive" between the bit of the code of the client ($y_i$) and the bit of the same index of the code of the server ($x_i$), and the values of the corresponding bits of the mask codes ($m_i$, $m_i$), the second element of the intermediate datum for each bit of the binary code of the client ($y_i$) comprises a randomly generated value from the second set ($r'_i$) added to the intersection of the values of the corresponding bits of the mask codes ($m_i$, $m_i'$), and when the client performs a linear combination of the intermediate data for all the bits ($y_i$) of its binary code, the client sums:

on the one hand, the first elements of the intermediate data to obtain the value of the Hamming distance between the codes of the client and the server on the bits at 1 of the mask codes added to the first sum (R) of the randomly generated values, and on the other hand, the second elements of the intermediate data, to obtain the size of the intersection of the mask codes added to the second sum (R') of randomly generated values.

9. The secure method according to claim 1, wherein the binary codes are biometric data.

10. The secure method according to claim 9, wherein the binary codes are encoded iris images.

11. A system for identification or authentication of an individual (I) among a base (DB) of N reference data ($b_0 \ldots b_{N-1}$) of listed individuals by evaluation of a function (F) described as a linear combination of sub-functions ($f_i$) with two binary inputs, wherein a client (C) and a server (S) respectively have a binary code (X), comprising n indexed bits ($x_1 \ldots x_n$), and a binary code (Y), comprising n indexed bits ($y_1, \ldots, y_n$), the identification or authentication including evaluation of the function (F) with the binary codes (X) and (Y) of the client (C) and of the server (S) as inputs, without either the client (C) or the server (S) obtaining information on the code of the other, the system comprising:

circuitry configured to acquire a datum (b) of the individual (I);

evaluate the function (F) between the datum (b) of the individual (I) and at least one reference datum of the listed individuals to determine a Hamming distance between the datum (b) and the at least one reference datum by performing a method including the server randomly generates n indexed values ($r_i$) and calculates the linear combination (R) of these values with the same linear combination as that applied to the sub-functions ($f_i$) to obtain the function (F), for each bit ($y_i$) of its binary code (Y), the client employs a technique of oblivious transfer to obtain from the server an intermediate datum comprising the randomly generated value ($r_i$) of the same index as the bit ($y_i$) of the code of the client, added to the value of the corresponding sub-function evaluated in the bit of the same index of the code of the server and in said bit of its binary code ($f_i(x_i,z_i)$), and the client performs a linear combination of the intermediate data for all the bits ($y_i$) of its binary code, with the same linear combination as that applied to the sub-functions to obtain the function (F), so as to obtain a final result (RF) comprising the linear combination (R) of randomly generated values ($r_1, \ldots, r_n$) added to evaluation of the function in both binary codes;

compare the Hamming distance between the datum (b) and the at least one reference datum to a predetermined threshold; and according to the results of the comparison, determine whether the individual (I) is a listed individual from which the at least one reference datum originates.

* * * * *